Sept. 30, 1952  F. A. GROSS  2,612,596
MICROWAVE HEATING
Filed Feb. 18, 1947
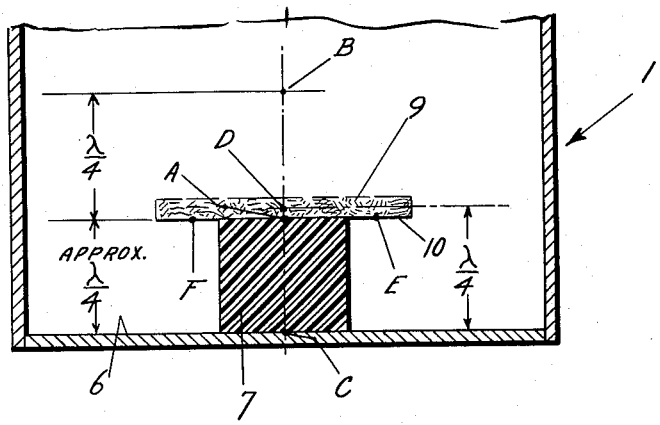
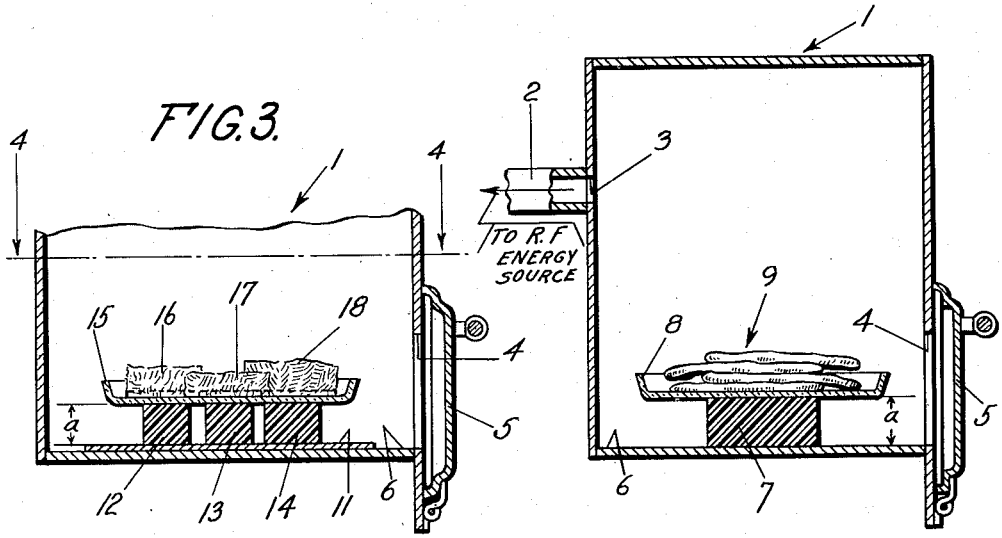
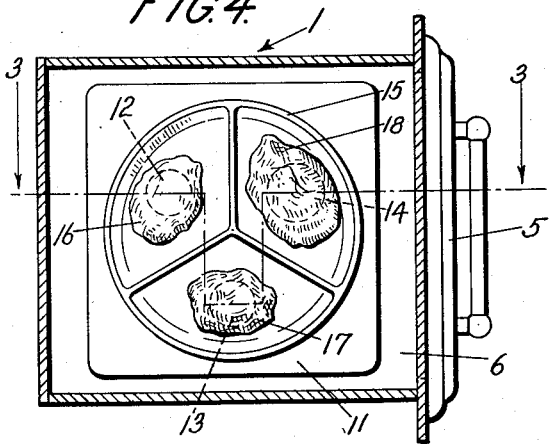
INVENTOR
FRITZ A. GROSS
BY Elmer J. Gorn
ATTY.

Patented Sept. 30, 1952

2,612,596

UNITED STATES PATENT OFFICE 2,612,596

MICROWAVE HEATING

Fritz A. Gross, Weston, Mass., assignor to Raytheon Manufacturing Company, Newton, Mass., a corporation of Delaware Application February 18, 1947, Serial No. 729,237

6 Claims. (Cl. 219—47)

This invention relates to high-frequency apparatus, and more particularly to a means for selectively heating dielectric masses.

An object of this invention is to devise a means for enabling substantially uniform heating of nonuniform dielectric bodies to be accomplished by radio-frequency energy.

Another object is to provide a means for causing selective coupling of radio-frequency energy into selected portions of food bodies.

A further object is to provide a means for producing selective coupling of radio-frequency energy into the central portions of frozen food bodies.

The foregoing and other objects of the invention will be best understood from the following description of some exemplifications thereof, reference being had to the accompanying drawing, wherein:

Fig. 1 is a vertical section through an oven utilizing my invention;

Fig. 2 is a partial vertical section through an oven utilizing my invention, shown on an enlarged scale for purposes of explanation;

Fig. 3 is a partial vertical section of an oven utilizing a modified form of my invention; and Fig. 4 is a section taken along line 4—4 of Fig. 3.

It has been found that masses of frozen food, for example masses composed of slices or layers of meat, as received from the food processors, are generally arranged in such a manner that the slices or layers of frozen food overlie each other in the central region or regions of the mass, and do not so overlie each other in the outer region or regions thereof. Such a mass will have nonuniform radio-frequency energy loss characteristics because of the nonuniformity in thickness of the dielectric material.

I have found that, when such a mass of frozen food is attempted to be heated by the use of radio-frequency energy, the ice crystals naturally present in all frozen foods tend to reflect the radio-frequency energy and, since there is an increased thickness of food in the central region of the mass and therefore also an increased thickness of ice crystals in this region, it is extremely difficult to heat said region. In other words, the central portion of the food mass may be said to have a lower radio-frequency loss characteristic than the remaining portions thereof. It is therefore desirable to be able to produce increased coupling of the radio-frequency energy into this central region of the frozen food body or mass, so as to properly heat said region. Although I have discussed the problem only with respect to frozen food bodies or masses composed of meat, it will be appreciated that a similar problem arises whenever it is desired to heat in a substantially uniform manner, by radio-frequency or microwave energy, other kinds of food, or in fact any dielectric body which has nonuniform radio-frequency energy loss characteristics. In all such cases it is desirable to be able to produce selective coupling of the radio-frequency energy into selected portions of the dielectric bodies in order to heat them uniformly.

Now referring to Fig. 1, a hollow thin-walled metallic enclosure or cavity 1 preferably has the shape of a rectangular parallelepiped, this enclosure serving as the oven of a radio-frequency or microwave heating device. Radio-frequency energy is supplied to the interior of cavity 1 from any suitable source (not shown), for example a magnetron, by means of a hollow waveguide 2 which is coupled to said interior by way of an aperture 3 in the rear wall of said cavity, said aperture being located somewhat above the horizontal mid-plane of the cavity. An access aperture 4 is provided in the front wall of oven 1, this aperture being closable by means of a hinged metal door 5. When door 5 is in its closed position, it will be seen that the cavity 1 is entirely closed, except for the energy supply aperture 3 above described, through which radio-frequency energy in the microwave region of the frequency spectrum, that is, wave energy having a wavelength of the order of thirty centimeters or less, is supplied to said activity. In the specification and claims, it is to be understood that the term "wavelength" is used to refer to the predetermined wavelength of the radio-frequency energy supplied to the cavity.

On the inner face of the bottom metallic wall 6 of the oven is placed a dielectric block or member 7, which, for example, may be prismoidal or cylindrical and which has a thickness or height $a$. Block 7 may be made of a low radio-frequency loss synthetic resin, such as polystyrene, for example. On the upper surface of block 7 is placed a dish 8 which contains the dielectric body or mass 9 to be heated by radio-frequency energy. In this figure the dielectric body 9 is represented as a plurality of layers of frozen food, the thicknesses of the individual layers being exaggerated for purposes of clarity. As shown in this figure, the layers overlie each other or overlap in the central portion or region of the mass, thereby producing an increased thickness of the body in this region. Block 7 is of such size that it underlies substantially this entire central region in which the layers of food overlap.

I have found that, if a block 7 of a low radio-frequency loss dielectric material having a proper dielectric constant, said block being approximately a quarter-wavelength in thickness, is placed between the bottom metallic wall of the oven and the dielectric body to be heated, the radio-frequency energy in the cavity will be more effectively coupled to the portion of the body underlain by such block; in other words, the coupling to such portion will be increased or made more effective than if such block were not used. I do not know exactly how or why this result is accomplished, but my present theory of operation of such a block is set out hereinafter.

When radio-frequency waves are supplied to the interior of cavity 1, reflections of such waves from the metallic walls, and particularly from the bottom wall, of said cavity cause a system of standing waves to be established therein, a voltage minimum in such system tending to be established at bottom wall 6 because of the metallic short-circuiting effect of such a wall.

Now referring to Fig. 2, which shows in a diagrammatic manner the lower end of the oven, the dielectric body 9 to be heated is shown as resting directly on the upper surface of dielectric block 7, without the interposition of a dish or plate. Such a showing is merely for purposes of ease in explanation, however, since a dish is ordinarily used between the block and the body.

First we will consider the situation existing when a block 7 is not provided between the body 9 and the bottom wall or floor of the oven, in which case the body 9 will be resting with its lower face 10 directly on the metallic oven floor. Because of the short-circuiting effect of this metallic surface, a standing wave voltage minimum or node would tend to be established at point A on this surface, as explained above. Point B, which is spaced a distance of a quarter-wavelength from point A, would therefore be at a voltage maximum. Since the thickness of body 9 is appreciably less than a quarter-wavelength, point B is located in the space above body 9.

Moreover, there is a very substantial impedance mismatch between body 9 and the air inside cavity 1. Thus, when body 9 is resting directly on the bottom wall 6 of the cavity or oven, a very substantial proportion of the microwave energy which impinges on the upper surface of body 9 is reflected, resulting in ineffective heating of the interior portions and also of the lower surface 10 of said body, since under these conditions there is no opportunity for energy reflected from the oven bottom wall 6 and/or the lower portions of the oven side walls to impinge on the lower surface 10 of body 9, said lower surface resting directly on bottom wall 6.

Now we will consider the situation present when a block 7 is provided between body 9 and bottom wall 6 on the oven. Block 7 is made of a material which has a dielectric constant such that an effective impedance match is provided between the body 9 and the block 7; as a result, there is no appreciable reflection of wave energy at the 7—9 interface. In the standing wave system a voltage minimum again tends to be established at the metallic wall 6, in the plane of which wall point C now lies, and a voltage maximum at point D, which is a quarter-wavelength away from point C. The dimension or distance a of Fig. 1, which is the thickness or height of block 7, is approximately a quarter-wavelength, so that the distance between points A and C is approximately a quarter-wavelength. Since this is the case, point D (the point of voltage maximum) is located within the confines of body 9, even though the thickness of said body is appreciably less than a quarter-wavelength. It will be seen, therefore, that by the addition of block 7, the body 9 has in effect been moved to the region of voltage maximum of the standing wave system. The heating effect of radio-frequency energy in a dielectric body is increased in regions of standing wave voltage maxima, so that there is an increased heating effect produced in body 9 by the addition of block 7. In other words, the radio-frequency energy is more effectively coupled into the body 9 in regions underlain by block 7, and such regions can be effectively selected by selecting the area and position of block 7. Since block 7 is made of a material having a low radio-frequency loss, said block is not heated appreciably by the radio-frequency energy.

Although the above effect of moving body 9 to the region of voltage maximum of the standing wave system may help to explain the increased selective heating effect made possible by the use of block 7, it is possible and perhaps preferable to explain said effect in another way. As previously described, block 7 provides an impedance match to body 9, so that there is no appreciable reflection of wave energy at the 7—9 interface. Block 7 has a height sufficient to allow energy reflected from the bottom wall 6 and from the lower portions of the oven side walls to impinge on the lower face 10 of body 9, at points both outside the area of block 7 (such as points E and F) and inside the area of block 7 (such as point A), block 7 efficiently conducting such energy.

At points on the bottom face 10 of body 9 outside the area of block 7, such as E and F, there is a meat-air interface which provides a discontinuity or impedance mismatch at all such points. Therefore, there is a substantial reflection of energy impinging on face 10 at each and every such point, so that the addition of block 7 does not increase the coupling of energy into body 9 at such "outside" points.

However, at points on the bottom face 10 of body 9 inside the area of block 7, such as A, there is a 7—9 interface or impedance match, so that no appreciable reflection of energy impinging on face 10 through block 7 occurs at these points. Therefore, the addition of block 7 does substantially increase the coupling of the radio-frequency energy into body 9 at such "inside" points, or into those areas of said body which are underlain by said block.

Referring again to Fig. 1, block 7 is positioned under the central region of body 9, where the layers of food overlap, so that increased heating of the body 9 by radio-frequency energy is effectuated in this region, which is where it is desired.

Now referring to Figs. 3 and 4, these figures disclose an oven 1 in which selective heating of a plurality of food masses or bodies may be carried on simultaneously. A thin metallic plate 11 of substantial area has a plurality of spaced upstanding dielectric blocks 12, 13, and 14 fastened thereto, these blocks all having a height or thickness a as before and being made of the same material as block 7. Plate 11, with blocks 12, 13 and 14, is a complete removable unit and is intended to be used with a standardized aggregation of foods, and other standard units may be provided by varying the number, size, and/or location of the dielectric blocks, in order to heat other standardized aggregations of foods. The lower face of plate 11 rests on the bottom wall 6 of the oven 1, and the unit 11—14 is removably inserted into said oven through aperture 4.

A sectionalized dish 15 has a plurality of food masses or bodies 16, 17, and 18 therein, one mass being in each section of said dish. Dish 15 with its contents is placed in oven 1, the bottom face of said dish resting on and being supported by the upper faces of blocks 12—14. Blocks 12—14 are so located that each block underlies a separate corresponding one of the food bodies 16—18, and the blocks are of such a size that each block underlies only the central portion of the corresponding food body. For example, block 12 underlies the central portion of body 16, block 13 underlies the central portion of body 17, and block 14 underlies the central portion of body 18.

Each of blocks 12, 13, and 14 has a height of approximately a quarter-wavelength and a dielectric constant such that it will act as an impedance-matching device, as explained above in connection with block 7. Therefore, when radio-frequency energy is supplied to cavity 1, said energy will be selectively coupled to the portion of each food body which is underlain by the corresponding block, resulting in a selective heating of each of the food bodies 16—18, in which the central portion of each food body is heated more efficiently than the outer portions thereof, because the central portion of each of the bodies is underlain by a suitable block.

It will be seen, from all of the above, that I have devised a means for selective radio-frequency heating of dielectric masses, and that, by proper positioning of such means, substantially uniform heating of any nonuniform dielectric body by radio-frequency energy may be easily accomplished.

Of course, it is to be understood that this invention is not limited to the particular details as described above, as many equivalents will suggest themselves to those skilled in the art. For example, the single dielectric block 7 of Fig. 1 may be mounted on a thin metallic plate, similar to plate 11 of Fig. 3, if desired. Various other variations will suggest themselves. It is accordingly desired that the appended claims be given a broad interpretation commensurate with the scope of this invention within the art.

What is claimed is:

1. In combination, a metallic enclosure, means for radiating radio-frequency energy into the interior of said enclosure, a dielectric body in said enclosure substantially spaced from the walls thereof, and a coupler for causing differential coupling of said energy to said body in different portions thereof, said coupler being positioned between one enclosure wall and said body.

2. In combination, a metallic enclosure, means for radiating radio-frequency energy into the interior of said enclosure, dielectric body in said enclosure substantially spaced from the walls thereof, and means for causing increased coupling of said energy to said body in selected portions thereof, said last-named means being positioned between one enclosure wall and said selected portions of said body.

3. In combination, a metallic enclosure, means for radiating microwave energy of a predetermined wavelength into the interior of said enclosure, a dielectric body in said enclosure substantially spaced from the walls thereof, and a dielectric member, substantially one-fourth of said wavelength thick, positioned between one enclosure wall and said body, a portion only of the surface of said body being positioned closely adjacent said member.

4. In combination, a metallic enclosure, means for radiating microwave energy into the interior of said enclosure, a dielectric body in said enclosure substantially spaced from the walls thereof, and a dielectric member positioned between one enclosure wall and said body and in contact with the latter, a portion only of the surface of said body being positioned closely adjacent said member, said member being made of a material having a wave impedance such that there is no appreciable reflection of wave energy at the interface between said member and said body.

5. In combination, a metallic enclosure, means for radiating microwave energy of a predetermined wavelength into the interior of said enclosure, a low-loss dielectric member, substantially one-fourth of said wavelength thick, in said enclosure and supported by the bottom wall thereof, and a dielectric body to be heated supported by said member, a portion only of the surface of said body being positioned closely adjacent said member.

6. In combination, a metallic enclosure, means for radiating radio-frequency energy into the interior of said enclosure, a low-loss dielectric member in said enclosure and supported by the bottom wall thereof, and a dielectric body to be heated supported by said member spaced from the walls of said enclosure, said member underlying only a selected portion of said body and being made of a material having a wave impedance such that there is no appreciable reflection of wave energy at the interface between said member and said body.

FRITZ A. GROSS.

REFERENCES CITED

The following references are of record in the file of this patent:

UNITED STATES PATENTS

| Number | Name | Date |
| --- | --- | --- |
| 2,259,318 | Mouromtseff | Oct. 14, 1941 |
| 2,280,824 | Hansen et al. | Apr. 28, 1942 |
| 2,370,161 | Hansen | Feb. 27, 1945 |
| 2,370,624 | Gillespie | Mar. 6, 1945 |
| 2,396,004 | Gilbert | Mar. 5, 1946 |
| 2,407,690 | Southworth | Sept. 17, 1946 |
| 2,433,368 | Johnson et al. | Dec. 30, 1947 |
| 2,464,403 | Klingaman | Mar. 15, 1949 |
| 2,464,404 | Gillespie | Mar. 15, 1949 |
| 2,465,102 | Joy | Mar. 22, 1949 |
| 2,495,415 | Marshall | Jan. 24, 1950 |
| 2,497,670 | Hanson et al. | Feb. 14, 1950 |
| 2,500,752 | Hanson et al. | Mar. 14, 1950 |
| 2,504,109 | Dakin et al. | Apr. 18, 1950 |
| 2,567,748 | White | Sept. 11, 1951 |

OTHER REFERENCES

Hutcheson: "Electronic Torch," The Welding Engineer, December 1945, page 90.

Radar Electronic Fundamentals, Navships 900,016, printed June 1944 (released July 1946), pages 371–374.